Patented Oct. 2, 1928.

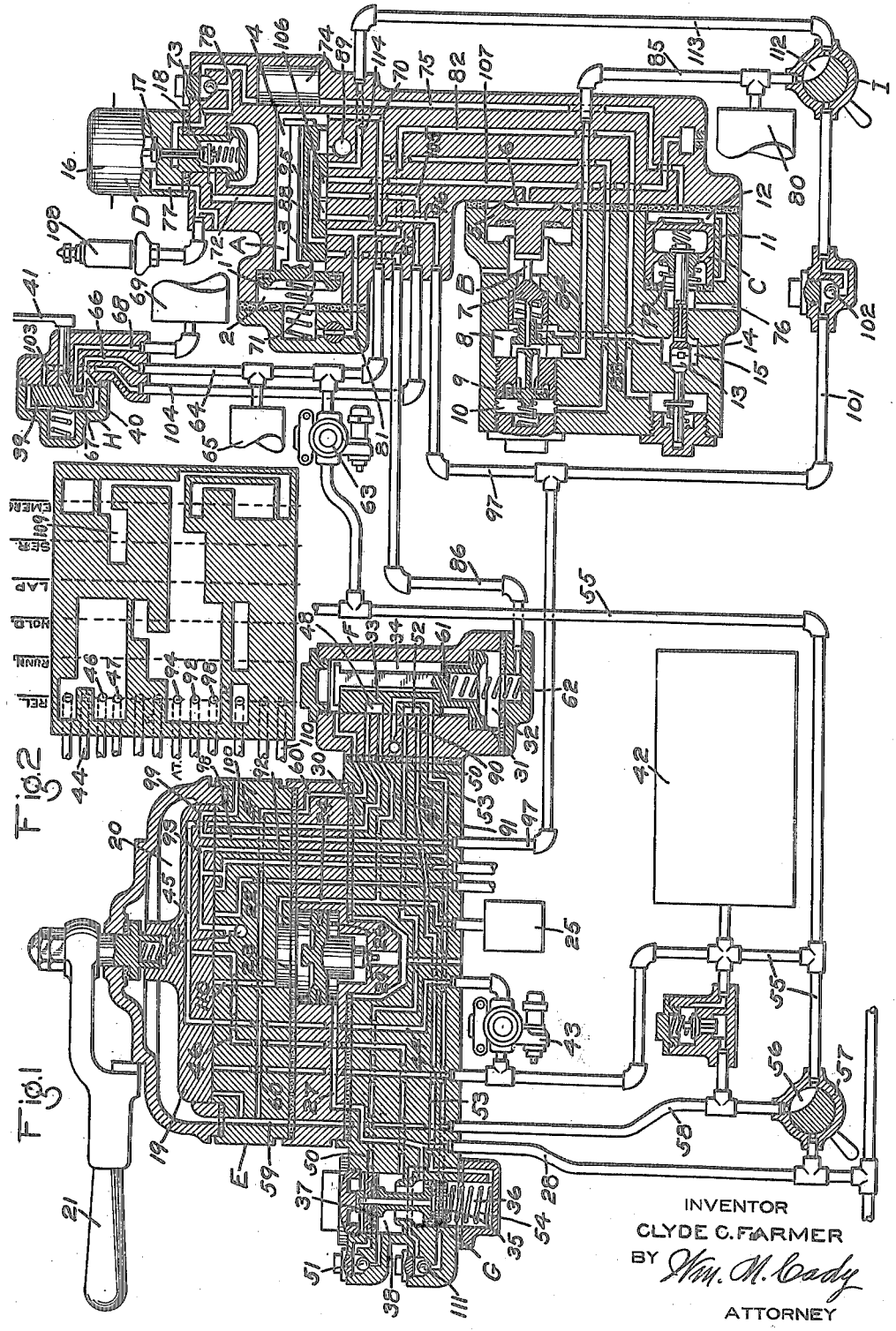

1,685,840

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC TRAIN STOP.

Application filed November 27, 1925. Serial No. 71,532.

This invention relates to automatic train control apparatus in which a brake application device on the train is controlled from the trackway.

One object of my invention is to so group and simplify the train apparatus, that the same may be conveniently installed in the engine cab.

Another object of my invention is to associate the brake application valve device with the brake valve device, so as to reduce the number of pipes required.

Another object of my invention is to provide a train control apparatus having means whereby the train must be brought to a stop, when the train control apparatus functions, before the engineer can release the brakes.

Other objects and advantages will appear in the following more detailed description of the invention.

In the accompanying drawing; Fig. 1 is a diagrammatic sectional view of a train control equipment embodying my invention; and Fig. 2 a diagrammatic development of the brake valve employed in the construction shown in Fig. 1.

As shown in the drawing, the equipment may comprise one unit having associated therein a pilot valve device A, an acknowledging valve device B, a timing valve device C, and a magnet valve device D. The other main unit includes a brake valve device E, a brake application valve device F, and a brake pipe cut-off valve device G.

In addition, there is provided a manual acknowledging valve H and a reset cock device I.

The pilot valve device A comprises a piston 1 contained in valve chamber 2 and a slide valve 3 operable by said piston and contained in valve chamber 4. The acknowledging valve device B comprises a piston 5 contained in piston chamber 6, a piston valve 7 contained in valve chamber 8, and a valve 9, contained in valve chamber 10, said valves being arranged in tandem and being operable by piston 5.

The timing valve device C comprises a piston 11 contained in piston chamber 12 and double beat valves 13 and 14 contained in valve chamber 15 and operable by piston 11. The magnet valve device D comprises a magnet 16 and double beat valves 17 and 18 adapted to be operated upon the energization and deenergization of the magnet 16.

The brake valve device E comprises a rotary valve 19 contained in valve chamber 20 and adapted to be operated by handle 21 and an equalizing discharge valve mechanism comprising a piston 22 having the chamber 23 at one side connected through passage 24 with the usual equalizing reservoir 25 and having the chamber 26 at the opposite side connected through passage 27 with the usual brake pipe 28. Piston 22 is adapted to operate the usual brake pipe discharge valve 29.

One of the sections 30 of the brake valve device E is provided with a seat face to which is applied the application valve device F, said valve device comprising a piston 31 contained in piston chamber 32 and a slide valve 33 contained in valve chamber 34 and operable by piston 31. Also carried by the brake valve section 30 is the brake pipe cut-off valve device G, which comprises a piston 35 contained in piston chamber 36 and a valve 37 contained in valve chamber 38 and operable by piston 35.

The manual acknowledging valve H, comprises a rotary valve 39 contained in valve chamber 40 and operable by a handle 41.

The magnet 16 is energized when the signal indicates a favorable traffic condition and is deenergized when the signal indicates an unfavorable traffic condition, and in the drawing the magnet 16 is shown as energized.

In operation, fluid under pressure is supplied from the usual main reservoir 42 and through the usual feed valve device 43 at the reduced pressure normally carried in the brake system to passage 44, and with the rotary valve 19 in running position, as shown in Fig. 1, through cavity 45 to passage 46, leading to valve chamber 38. With the valve 37 in open position, as shown in the drawing, fluid flows from valve chamber 38 to passage 27, which leads to the brake pipe 28 and also chamber 26 of the equalizing discharge piston 22. Fluid also flows through cavity 45 to passage 47 and thence, with the application slide valve 33 in normal release position, as shown in the drawing, through cavity 48 in slide valve 33 to passage 49, which leads to passage 24 and the equalizing reservoir.

25, as well as to chamber 23 of the piston 22. From valve chamber 38 of the brake pipe cut-off valve device G, fluid flows through passage 50, past the check valve 51, cavity 52 in slide valve 33, and passage 53 to chamber 36 below piston 35, and the fluid pressures being now balanced on opposite sides of piston 35, the spring 54 holds said piston and the valve 37 in open position.

Fluid from the main reservoir 42 flows through pipe 55 and cavity 56 in the usual dead engine cock 57 to pipe 58 and passage 59, which leads to the rotary valve chamber 20 of the brake valve device. From passage 59 fluid flows through passage 60 to valve chamber 34 of the application valve device F and equalizes from said valve chamber through a restricted port 61 to piston chamber 32. The fluid pressures on opposite sides of piston 31 being thus balanced, spring 62 maintains piston 31 and slide valve 33 in the normal release position, as shown in the drawing.

From pipe 55, fluid is supplied through a pressure reducing valve device 63 to a pipe 64 having a supply reservoir 65 connected thereto and communicating with a passage 66 in the manual acknowledging valve H, which passage leads to the valve chamber 40 and also, in the normal position of the valve 39, is connected through cavity 67 with passage 68 and acknowledging reservoir 69, so that said reservoir is normally charged with fluid under pressure.

Fluid also flows from pipe 64 through passage 70 to valve chamber 4 of the pilot valve device A and equalizes through a restricted port 71 in piston 1 to piston chamber 2. The fluid pressures on opposite sides of piston 1 being thus balanced, said piston and slide valve 3 are maintained in the position shown in the drawing.

The magnet 16 being energized, the valve 17 is held seated while the valve 18 is unseated, so that fluid under pressure flows through passage 72, past the valve 18 to passage 73, charging the timing reservoir 74. Fluid from the timing reservoir flows through passage 75 to piston chamber 12 of the timing valve device C, and the chamber at the opposite side of the piston 11 being connected to an atmospheric exhaust port 76, the piston 11 is maintained in the position shown, with the valve 13 seated and the valve 14 unseated.

If the train should pass a signal indicating an unfavorable traffic condition, the magnet 16 will be deenergized and if the engineer fails to acknowledge the signal indication, an automatic application of the brakes will be effected in the following manner.

Upon deenergization of magnet 16, the valve 18 will be seated and the valve 17 opened, so that fluid under pressure is vented from the timing reservoir 74 to atmospheric exhaust passage 77. When the pressure in timing reservoir 74 has been reduced to a predetermined degree, the time being dependent upon the rate of flow through a restricted portion 78 of passage 73, the piston 11 of the timing valve device C will be shifted to the right by spring 79, causing the valve 14 to be seated and the valve 13 unseated. Fluid under pressure will then be vented from piston chamber 2 of the pilot valve device A to the stop reservoir 80, through passage 81, passage 82, past valve 13 to passage 83 and valve chamber 8, and thence through passage 84 and pipe 85 to the stop reservoir 80.

Piston 1 will then be shifted to the left and slide valve 3 is moved, so that piston chamber 32 of the application valve device F is connected to the atmosphere through pipe 86, passage 87, cavity 88 in slide valve 3 and exhaust port 89. With slide valve 3 in the above position, the stop reservoir 80 is connected to the atmosphere through the reset cock I by way of cavity 112 in the cock, pipe 113, passage 114, cavity 88 in slide valve 3 and exhaust port 89.

The venting of fluid under pressure from piston chamber 32 as above described, causes the downward movement of piston 31 and the shifting of slide valve 33 to a position in which the equalizing reservoir 25 and piston chamber 23 of the equalizing discharge piston 22 are connected to the atmosphere through passage 24, passage 49, cavity 48 in slide valve 33 and exhaust port 90. The piston 22 is then operated by brake pipe pressure in chamber 26 to open the valve 29 and discharge fluid from the brake pipe 28, so as to effect an application of the brakes in the usual manner.

With the slide valve 33 in application position, the piston chamber 36 of the brake pipe cut-off valve device G is connected to the atmosphere, through passage 53, cavity 52 in slide valve 33, passage 91, passage 92, cavity 93 in rotary valve 19 and exhaust port 94. Piston 35 is then moved downwardly by brake pipe pressure in chamber 38, so as to seat the valve 37 and cut off communication from the brake pipe 28 to passage 46, thereby preventing the supply of fluid to the brake pipe and the release of the brakes by the usual manipulation of the brake valve.

In order to release the brakes after an automatic train control application, the engineer must first move the brake valve handle to lap position, in order to cut off communication from piston chamber 2 to the atmosphere, which is open when the brake valve handle is in running, release, and holding positions, by way of passage 81, cavity 95 in slide valve 3, passage 96, pipe 97, passage 98, cavity 99 in the rotary valve 19 of the brake valve device and exhaust port 100. The engineer must then get off the engine and turn the reset cock I to a position in which the pipe 85, in connection with piston chamber 2, is cut off from pipe 113, which is at this time connected to the exhaust port 89. In this position of the reset cock, the cavity 112 connects pipe 85 with a pipe 101, which communicates with pipe 97, past check valve 102. All atmospheric connections to piston chamber 2 are now closed, permitting fluid under pressure to equalize from valve chamber 4 through port 71 to piston chamber 2. The piston 1 and slide valve 3 are then shifted to normal release position, in which passage 89 is blanked, so that fluid pressure can build up in the piston chamber 32 of the application valve device F, permitting the spring 62 to return the parts to release position.

The engineer must now return the reset cock I to its normal position, as shown in the drawing, and then when he returns to the engine cab, he may effect the release of the brakes in the usual manner, by moving the brake valve handle 21 first to release position and then to running position. If the engineer fails to move the reset cock back to its normal position, then he will be unable to effect the release of the brakes by movement of the brake valve handle to release or running positions, since in both of these positions, the pipe 97 is connected to the atmospheric exhaust port 100, and the stop reservoir 80 will therefore be connected to the atmosphere, by way of pipe 85, cavity 112 in the reset cock, pipe 101, and pipe 97, thus causing the movement of the pilot valve device A to the position in which the operation of the application valve device F is effected so as to cause an application of the brakes to be made, in the same manner as hereinbefore described.

The engineer may prevent the brakes from being applied by the operation of the train control apparatus when an unfavorable signal indication is received, by moving the manual acknowledging valve handle 41 to a position in which the normally charged acknowledging reservoir 69 is connected to piston chamber 6 of the acknowledging valve device B by way of passage 103, pipe 104, passage 105, cavity 106 in slide valve 3 and passage 107. Fluid under pressure thus supplied, shifts piston 5 to the left and causes the piston valve 7 to close the passage 83 so that the stop reservoir 80 will not be connected to piston chamber 2 of the pilot valve device A when the train control apparatus is operated, and consequently the brake application valve device will not be operated to effect an application of the brakes.

In order to warn the engineer by an audible signal that the signal indication is unfavorable, a whistle 108 is connected to passage 77, so that when the magnet 16 is de-energized upon receipt of an unfavorable signal indication, fluid under pressure will be supplied to the whistle.

If it is desired to effect a manual service application of the brakes, the brake valve handle 21 is turned to service application position, in which the equalizing reservoir 25 is connected to the exhaust through passage 49, cavity 48 in application slide valve 33, passage 47, cavity 109 in rotary valve 19 and exhaust port 94, and the reduction in equalizing reservoir pressure as thus effected then causes a servce application of the brakes in the usual manner.

If it is desired to effect an emergency application of the brakes, the brake valve handle is turned to emergency application position, in which passage 46, connected to the brake pipe 28 through valve chamber 38 of the brake pipe cut-off valve device G, and passage 110, leading to the equalizing discharge piston chamber 23 are connected to the exhaust through a cavity in the rotary valve 19, thereby causing a sudden reduction in brake pipe pressure and a consequent emergency application of the brakes.

In order to ensure that the valve 37 of the brake pipe cut-off valve device G will be held open during an emergency application of the brakes, main reservoir pressure is supplied to piston chamber 36, in emergency position of the brake valve, from the rotary valve chamber through a port in rotary valve 19 to passage 92 and thence past check valve 111 to passage 53, which leads to piston chamber 36. Check valve 51 prevents escape of fluid from passage 53 by way of cavity 52 in application slide valve 33 and passage 50.

The supply reservoir 65 connected to pipe 64 is for the purpose of providing additional volume, so that fluctuations in feed valve pressure will not interfere with the proper operation of the train control apparatus.

Having now described my invention, what I claim as new and desire to secure by Letters Patent, is:—

1. In a train control apparatus, the combination with a brake pipe and a brake valve device including a casing section, of a brake application valve device carried by said section, automatic train control means for controlling the operation of said brake application valve device, and a valve device controlled by said brake application valve device for cutting off communication through which fluid under pressure is supplied to the brake pipe.

2. In a train control apparatus, the combination with a brake pipe and a brake valve device including a casing section, of a brake application valve device carried by said section, automatic train control means for controlling the operation of said brake application valve device, and a valve device associated with said brake valve device and controlled by said brake application valve device for controlling communication through which fluid under pressure is supplied to the brake pipe.

3. In a train control apparatus, the combination with a brake pipe and a brake valve device for supplying fluid under pressure to the brake pipe, of a brake application valve device carried by said brake valve device, train control means for controlling the operation of said brake application valve device, a valve mechanism for controlling communication through which said brake valve device supplies fluid under pressure to the brake pipe, the operation of said valve mechanism being controlled by said brake application valve device.

4. In a train control apparatus, the combination with a brake valve device for normally controlling the release of the brakes and automatic train control mechanism for effecting an application of the brakes, of means, inaccessible to the engineer while in the cab of the vehicle, the operation of which is necessary before the brakes can be released.

5. In a train control apparatus, the combination with a brake valve device and automatic train control mechanism for effecting an application of the brakes, of means, inaccessible to the engineer, while in the cab of the vehicle, for effecting the resetting of the train control mechanism so as to permit the release of the brakes by operation of the brake valve device, said means being ineffective to reset said mechanism while the brake valve device is in a position for effecting the release of the brakes.

6. In a train control apparatus, the combination with a brake valve device and automatic train control mechanism for effecting an application of the brakes, of means, inaccessible to the engineers, while in the cab of the vehicle, for effecting the resetting of the train control mechanism so as to permit the release of the brakes by operation of the brake valve device, said brake valve device being ineffective to effect the release of the brakes while said means is in the position for effecting the resetting of the train control mechanism.

7. In a train control apparatus, the combination with a brake valve device and automatic train control mechanism for effecting an application of the brakes, of means, inaccessible to the engineer, while in the cab of the vehicle, for effecting the resetting of the train control mechanism so as to permit the release of the brakes by operation of the brake valve device, said means being ineffective to reset while the brake valve device is in a brake release position and said brake valve device being ineffective to release the brakes while said means is in the reset position.

8. In a train control apparatus, the combination with a brake valve device, of automatic train control means including a valve device operated by the venting of fluid under pressure for effecting an application of the brakes and a manually operable cock movable to a position in which communication through which fluid is vented from said valve device is cut off and said valve device is connected to a vent port when said brake valve device is in a position for effecting the release of the brakes.

9. In a train control apparatus, the combination with a brake pipe and a brake valve device having a position in which fluid under pressure is supplied to the brake pipe, of a brake application valve device, train control mechanism for effecting the operation of said brake application valve device, a valve for controlling communication through which said brake valve device supplies fluid to the brake pipe, and a piston operated upon movement of said brake application valve device to effect an application of the brakes, for operating said valve to cut off said communication.

In testimony whereof I have hereunto set my hand.

CLYDE C. FARMER.